United States Patent [19]
Cox

[11] Patent Number: 5,238,133
[45] Date of Patent: Aug. 24, 1993

[54] ELECTRICAL ENCLOSURE WITH RAINPROOF SEAL

[75] Inventor: Russell Cox, Frankfort, Ky.

[73] Assignee: Square D Company, Palatine, Ill.

[21] Appl. No.: 990,816

[22] Filed: Dec. 14, 1992

Related U.S. Application Data

[63] Continuation of Ser. No. 526,077, May 18, 1990, abandoned.

[51] Int. Cl.⁵ ............................................. B65D 55/00
[52] U.S. Cl. ...................................... 220/3.8; 220/331
[58] Field of Search .................. 220/3.2, 3.8, 331, 356

[56] References Cited

U.S. PATENT DOCUMENTS

| | | | |
|---|---|---|---|
| 2,277,618 | 3/1942 | Utter | 220/331 X |
| 2,656,948 | 10/1953 | McGee | 220/3.8 X |
| 2,782,455 | 2/1957 | Motsinger | 220/331 X |
| 2,877,919 | 3/1959 | Kobryner | 220/3.8 |
| 2,897,993 | 8/1959 | Uecker et al. | 220/3.8 X |
| 3,165,225 | 1/1965 | Reitzel | 200/35 |
| 3,716,815 | 2/1973 | Riches | 220/3.8 X |
| 3,820,282 | 6/1974 | Kornylak | 49/255 |
| 4,194,100 | 3/1980 | Cox et al. | 200/50 A |
| 4,548,330 | 10/1985 | Hewitt et al. | 220/210 |
| 4,756,123 | 7/1988 | Roche et al. | 49/255 |

*Primary Examiner*—Steven M. Pollard
*Attorney, Agent, or Firm*—Larry I. Golden; Kareem M. Irfan; Wayne S. Stoppelmoor

[57] ABSTRACT

There is provided an electrical enclosure that maintains a rainproof seal using a formed lip, an elongated nub, and barrel hinges with spaced apart members therebetween to allow vertical movement of the enclosure door.

3 Claims, 2 Drawing Sheets

ELECTRICAL ENCLOSURE WITH RAINPROOF SEAL

This is a continuation of copending application Ser. No. 07/526,077 filed on May 18, 1990, now abandoned.

BACKGROUND OF THE INVENTION

The present invention generally relates to electrical enclosures and in particular to rainproof electrical enclosures.

Certain industrial environments require electrical enclosures that provide protection against falling rain, sleet, snow, and other environmental debris. Additionally, many applications require NEMA 3 R ratings.

It is well known in the art to use a gasket to provide for a rainproof seal. However, it would be desirous to have an enclosure that would eliminate the gasket while maintaining the rainproof seal and the NEMA 3 R rating.

SUMMARY OF THE INVENTION

This invention provides an electrical enclosure with a rainproof seal. This invention includes hinges that allow the door to move vertically as well as rotationally. Also included is an elongated nub and lip system for providing the rainproof seal.

In accordance with one aspect of this invention, there is provided an electrical enclosure comprising a box portion, a door, means for holding door to the enclosure, and means integral with the enclosure for providing a substantially rainproof seal upon closing the door.

In accordance with another aspect of this invention, there is provided an electrical enclosure comprising a box portion, a door pivotally mounted on the box, hinge means for securing the door to the box and allowing vertical movement of the door, an elongated nub extending along a portion of the box portion, and a lip extending along a portion of the door with the lip engagingly overlapping said nub when the door is in the closed position.

In accordance with another aspect of this invention, there is a system for providing a substantially rainproof seal on a box comprising a pivotally mounted door, at least one barrel hinge attaching the box to the door and having spaces between barrels to allow for vertical movement of the door, an elongated nub extending along a portion of the box, and a lip extending along a portion of the door with the lip engagingly overlapping the nub when the door is in the closed position.

It is an object of this invention to provide an electrical enclosure with a substantially rainproof seal.

It is another an object of this invention to provide an electrical enclosure that can be used in both indoor and outdoor applications.

It is a further an object of this invention to provide an electrical enclosure that requires less parts than enclosures taught by the prior art.

Other objects and advantages will appear when the following description is considered along with the accompanying drawings.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

In general the present invention provides an electrical enclosure that uses the weight of the enclosure door to form a rainproof seal between a box portion and the door. A specially designed barrel hinge, that allows vertical displacement of the door, is necessary for the system to operate properly. A lip on the door engagingly overlaps a protruding nub portion on the box to provide the rainproof seal.

Figure 1:
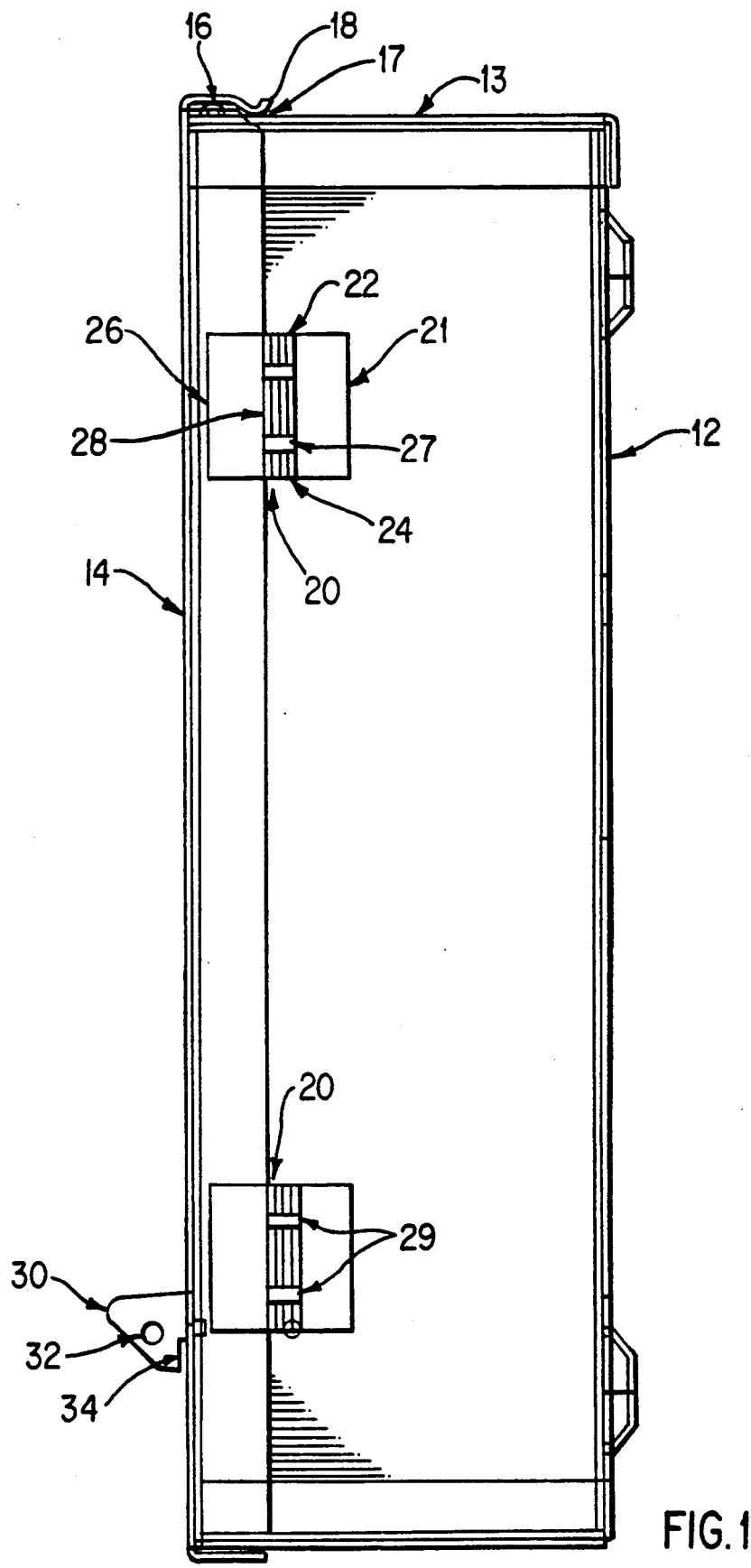
FIG. 1 illustrates a side view of an electrical enclosure designed according to the teachings of the present invention.
Figure 2:
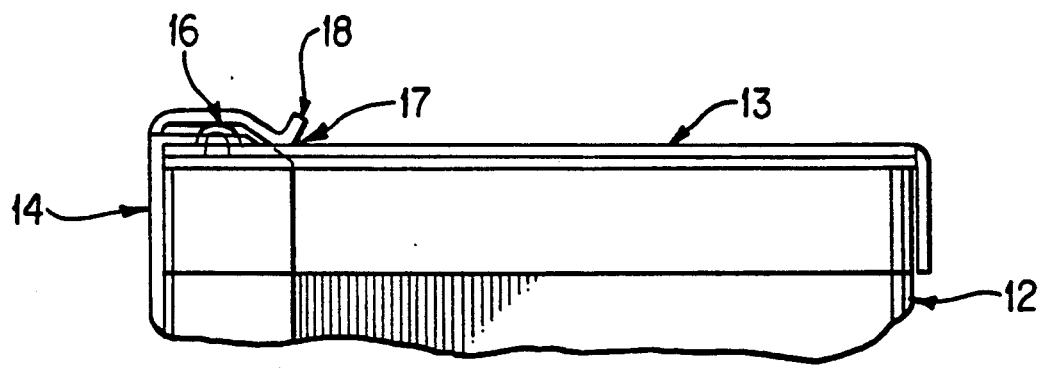
FIG. 2 illustrates an enlarged fragmentary view of FIG. 1.
Figure 3:
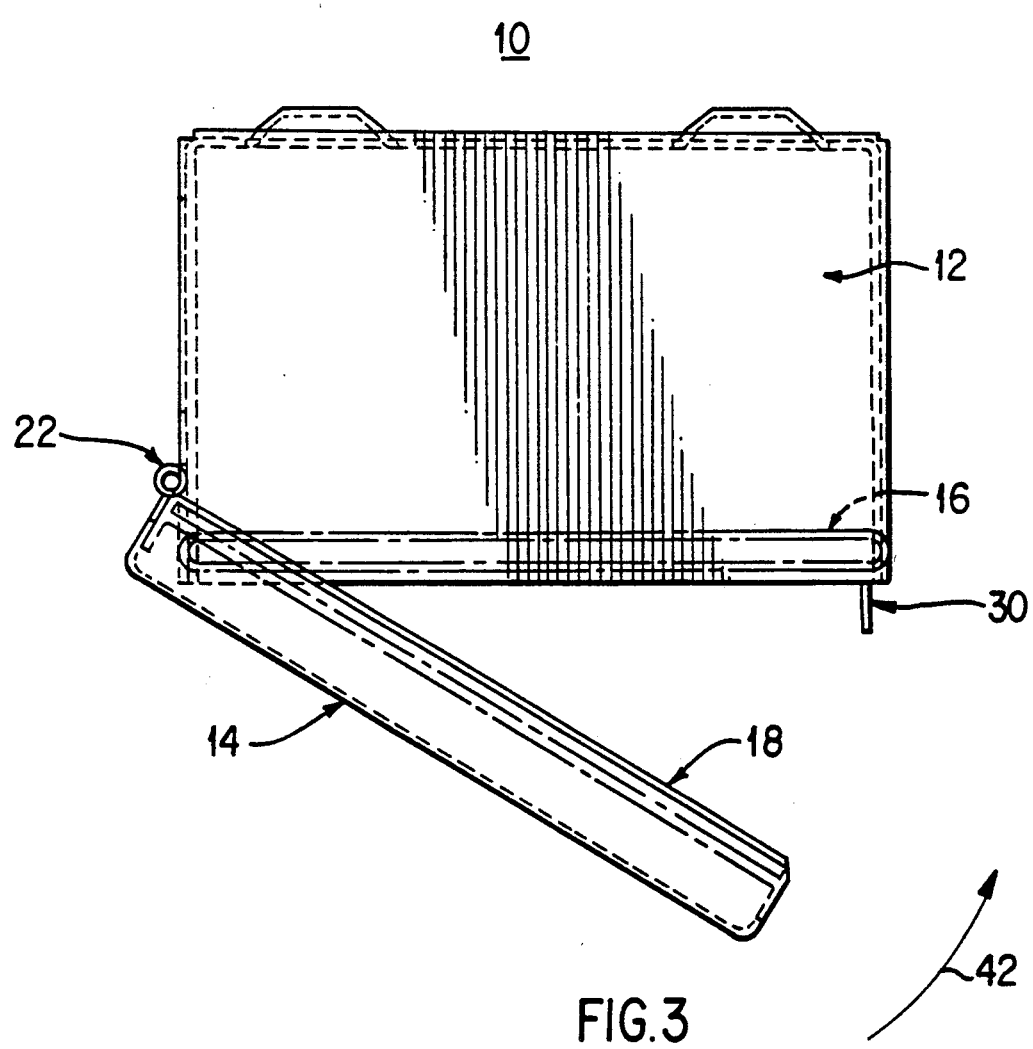
FIG. 3 illustrates the top view of FIG. 1, with the door open.

With reference to the drawings, anelectrical enclosure 10 constructed in accordance with the teachings of the present invention is shown in FIGS. 1-3. In FIG. 1, enclosure 10 includes a box portion 12 having a door 14 pivotally connected to the box via barrel hinge system 20. Barrel hinge system 20 consists of barrel hinge plate members 21 and 26 attached to box 12 and door 14 respectively. Cylindrical barrel portions 22 and 24 are formed from barrel hinge plate 21 and cylindrical barrel portion 28 is formed from barrel hinge plate 26. The cylindrical barrel portion 28 is intermeshed between cylindrical barrel portions 22 and 24 and has a pivot pin 27 passing through barrel portions 22, 24, and 28. Spaces 29 are provided between said barrels for allowing relative movement whereby the door 14 may move vertically along the pivot pin 27.

In FIG. 2, as door 14 pivots closed, a formed lip 18, disposed on door 14, cams over an elongated nub 16, which forms part of box portion 12. This camming motion is permitted due to spaces 29 between cylindrical barrel portions 22, 24, and 28 that allow for vertical movement of door 14. After lip 18 completely overlaps nub 16, the weight of door 14 causes the door to drop down creating a rainproof seal 17 between lip 18 and top of box 13. The door's weight, lip 18, and nub 16 forceably combined maintain closure of door 14 as well as a rainproof seal.

Referring back to FIG. 1, when door 14 is closed, a latching portion 34 of a releasable latch member 30 latches the door in the closed position. Locking aperture 32 provides for engaging means for locking door 14 closed.

FIG. 3 illustrates enclosure 10 with the door 14 open and lip 18. Elongated nub 16 extends across the entire width of box 12, but it may be shorter in length if desired. Also, a plurality of the nubs may be utilized to accomplish the same purpose.

While there have been shown and described what are at present considered the preferred embodiments of the invention, it will be obvious to those skilled in the art that various changes and modifications may be made therein without departing from the scope of the invention as defined by the appended claims.

I claim:

1. A substantially rainproof electrical enclosure comprising:
    a box portion;
    a door;
    hinge means mounted on said box portion for pivotably holding said door to said box portion, said hinge means comprising a pivot pin passing through intermeshed cylindrical barrels, said barrels having spaces therebetween for allowing vertical movement of said door;

a releasable latch member mounted on said box and projecting forwardly beyond the front surface of said door when said door is in the closed position, said latch member having a latching portion normally overlapping said front surface of said door to latch said door in the closed position;

an elongated rounded nub extending upwardly from said box portion along an exterior top portion thereof; and a lip extending along a portion of said door and including an upwardly extending portion adapted to cam over said nub, thus imparting vertical movement to said door during closing of said door, and engagingly overlap said rounded nub, when said door is in the closed position, in order to form a rainproof seal around the electrical enclosure.

2. The enclosure as claimed in claim 1, wherein said latch member includes an aperture therein for engaging means for locking said enclosure door in a closed position.

3. An electrical enclosure comprising:

a box portion;

a door pivotably mounted on said box;

hinge means for pivotably securing said door to said box portion, said hinge means including a pivot pin passing through intermeshed cylindrical barrels having spaces therebetween for allowing vertical movement of said door;

an elongated rounded nub extending upwardly from said box portion along an exterior top portion of said box portion; and a lip extending along a portion of said door and including an upwardly extending portion adapted to cam over said nub, thus imparting vertical movement to said door during closing of said door, and engagingly overlap said rounded nub, when said door is in the closed position, in order to form a rainproof seal around the electrical enclosure.

* * * * *